Sept. 23, 1947.  W. F. MERRITT  2,427,973
TIRE CHAIN
Filed June 5, 1946   2 Sheets-Sheet 1

INVENTOR
WILLIAM F. MERRITT

Sept. 23, 1947.  W. F. MERRITT  2,427,973
TIRE CHAIN
Filed June 5, 1946  2 Sheets-Sheet 2
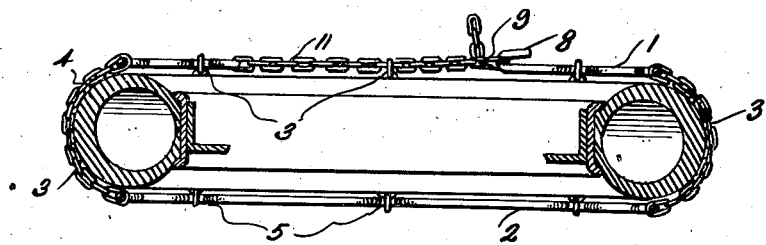
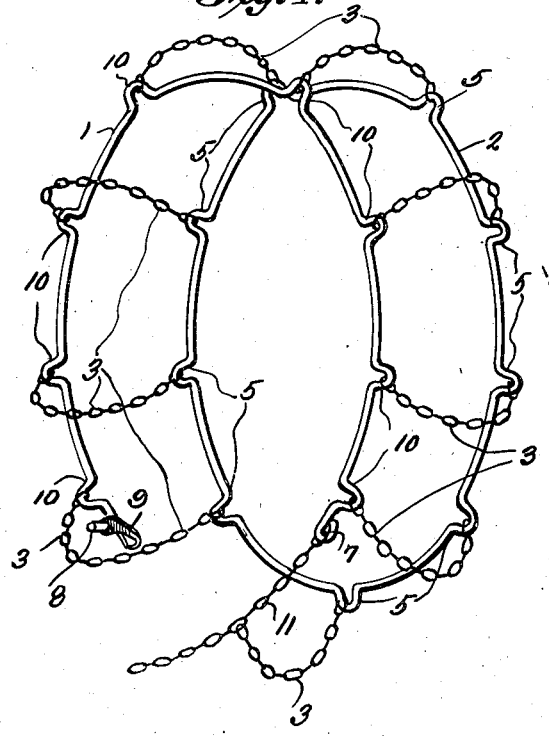
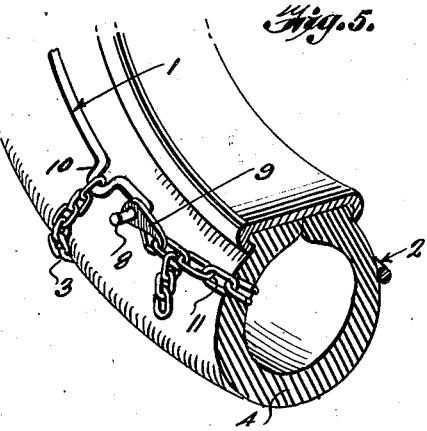
INVENTOR
WILLIAM F. MERRITT
BY
ATTORNEY Patented Sept. 23, 1947

2,427,973

UNITED STATES PATENT OFFICE 2,427,973

TIRE CHAIN

William F. Merritt, Middletown, N. Y.

Application June 5, 1946, Serial No. 674,572

1 Claim. (Cl. 152—242)

This invention relates to tire chains and it is one object of the invention to provide an antiskid device for a tire consisting of side rings carrying cross-chains for extending across the tread portion of a tire, the side rings being of such formation that the device may be easily and quickly applied to a tire without jacking up a wheel, in order to secure the device about the wheel.

Another object of the invention is to provide an antiskid device wherein cross chains are secured at their ends to radially offset portions of side rings, one ring being a complete ring and the other a partial ring formed of resilient rod-metal so that it may be expanded and slipped across a tire and into place against the inner side of the tire, a chain having one end secured to an end of the partial ring being then tightened and engaged with a hook carried by the other end of the partial ring to secure the device in place about the tire.

Another object of the invention is to provide an antiskid device so constructed that when not in use it may be reduced to a minimum bulk and stored in the rear trunk of an automobile where it will be out of the way but convenient when needed.

Another object of the invention is to provide a device of this character which is simple in construction, easy to apply or remove, and capable of being manufactured at small cost.

The invention is illustrated in the accompanying drawings wherein:

Fig. 3 is a sectional view taken along line 3—3 of Figure 1.

Fig. 4 is a perspective view of the improved antiskid device.

Fig. 5 is a fragmentary perspective view showing the chain of the partial ring secured.

Figure 1:
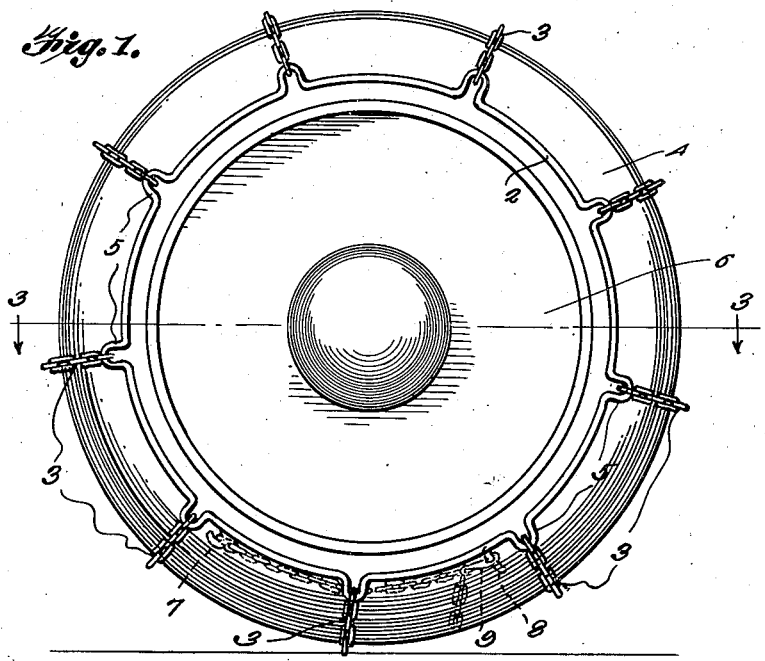
Fig. 1 is a view looking at the outer side of a wheel to which the improved antiskid device has been applied.
Figure 2:
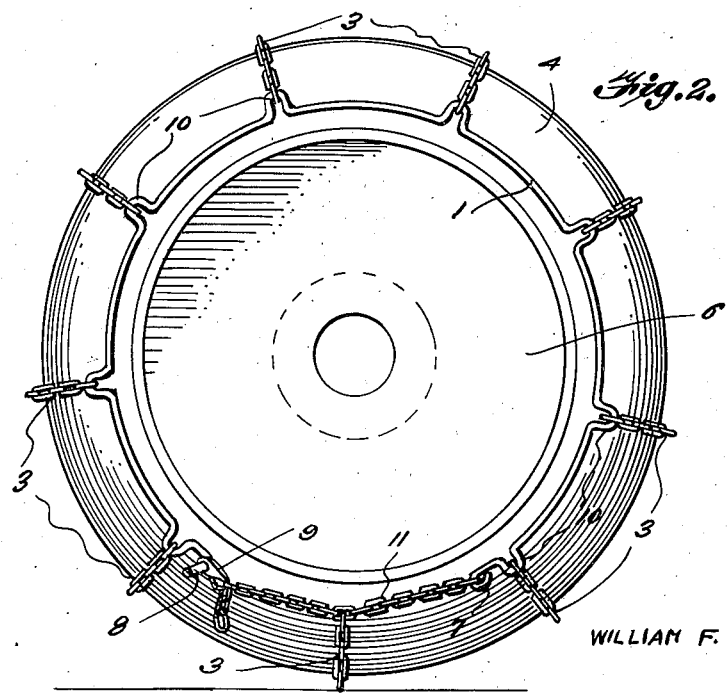
Fig. 2 is a view similar to Figure 1 looking at the inner side of the wheel.

This improved antiskid device consists briefly of inner and outer rings 1 and 2 and cross chains 3 which extend across the tread portion of a tire 4. The outer ring 2 is formed of stiff rod metal and is a complete ring, portions of the ring being crimped to form outstanding radially extending U-shaped projections or anchors 5 which are spaced from each other circumferentially of the ring and have ends of the cross chains 3 engaged with them. The inner ring 1 is a partial ring and is formed from resilient rod metal. Ends of the strand or rod from which the ring 1 is formed are spaced from each other a distance appreciably less than the diameter of the wheel 6 and the tire 4 carried thereby and one end of the rod is bent to form an eye or closed hook 7 while its other end is bent to form an outstanding bill 8 carrying a hook or latch 9.

Portions of the rod forming the ring are crimped to form outstanding radially extending U-shaped projections or anchors 10 corresponding to the anchors and so spaced from each circumferentially of the ring that when the device is applied to a tire the anchors 5 and 10 will be disposed opposite each other and the cross chains 3 which have their ends engaged with the opposed anchors 5 and 10 extend straight across the tire transversely thereof. A chain 11 has one end engaged with the eye 7 and is of such length that when the device is applied it may be drawn towards the end of the ring having the bill 8 and the hook 9 engaged with a link of the chain to hold the partial ring under tension and prevent it from slipping out of its proper position against the inner side face of the tire. One of the cross chains 3 has an end connected with a link of the chain 11, substantially midway the length thereof. Therefore when the device is applied to a tire the cross chain connected with the chain 11 will be held straight across the tire as well as the other cross chains.

When the improved antiskid device is to be applied to the tire of an automobile, the person applying the device crouches on the ground close to the outer side of the wheel of the car and grasps the partial ring near enough to ends of the rod from which it is formed to permit it to be spread a sufficient distance for the ring to be slipped over and across the tire until it is disposed at the inner side of the tire. Ends of the partial ring are then released and it will contract to its normal diameter. The free end of the chain 11 is then grasped and pull exerted to draw the cross chain engaged with it into place across the tire. If it is found that the wheel is in such position that the cross chain can not be drawn across the tire the automobile may be moved forwardly until the wheel has been turned sufficiently to allow this to be done. By exerting pull upon the chain 11 and the bill 8 the ends of the partial ring may be brought towards each other and the hook 9 then engaged with a link of the chain and when pull upon the chain and the bill is released the chain will be held caught and the partial ring kept under tension and the cross chains held in proper engagement with the tire. When the device is to be removed the hook 9 is released from the chain 11 and the partial ring may then be spread and drawn outwardly across the tire and the two rings may then be disposed in close side by side relation to each other and the device placed in the trunk of an automobile.

Having thus described the invention, what is claimed is:

An antiskid device comprising a continuous side ring formed of stiff metal and having portions crimped to form outstanding radially extending U-shaped anchors spaced from each other circumferentially of the ring, a partial side ring formed of resilient metal and having portions crimped to form outstanding radially extending U-shaped anchors spaced from each other circumferentially of the partial ring and disposed opposite the anchors of the continuous side ring, ends of the partial ring being spaced from each other a distance appreciably less than the diameter of the continuous ring and having one end bent to form an eye and its other end bent to form a bill, a fastener carried by said bill, cross chains extending between said rings and having their ends connected with opposed anchors of the rings, a securing chain having one end engaged with the eye of the partial ring and being of a length adapting it to extend between ends thereof and having its other end portion engaged with the fasteners carried by said bill, and a cross chain having one end connected with an anchor of the continuous ring and its other end connected with the securing chain intermediate the length thereof.

WILLIAM F. MERRITT.

REFERENCES CITED

The following references are of record in the file of this patent:

UNITED STATES PATENTS

| Number | Name | Date |
|---|---|---|
| 2,328,808 | Holtz | Sept. 7, 1943 |
| 1,595,339 | Brittain | Aug. 10, 1926 |